(12) United States Patent
Shi et al.

(10) Patent No.: US 11,134,379 B2
(45) Date of Patent: Sep. 28, 2021

(54) IDENTITY AUTHENTICATION METHOD, DEVICE, AND SYSTEM

(71) Applicant: Huawei Technologies Co., Ltd., Shenzhen (CN)

(72) Inventors: Jie Shi, Singapore (SG); Yanjiang Yang, Singapore (SG); Guilin Wang, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 16/421,039

(22) Filed: May 23, 2019

(65) Prior Publication Data

US 2019/0281453 A1  Sep. 12, 2019

Related U.S. Application Data

(63) Continuation of application No. PCT/CN2017/092900, filed on Jul. 14, 2017.

(30) Foreign Application Priority Data

Nov. 24, 2016  (CN) .......................... 201611052569.8

(51) Int. Cl.
*H04L 29/06* (2006.01)
*H04W 12/0433* (2021.01)
(Continued)

(52) U.S. Cl.
CPC ......... *H04W 12/0433* (2021.01); *H04L 29/00* (2013.01); *H04L 29/06* (2013.01);
(Continued)

(58) Field of Classification Search
CPC ......... H04W 12/0433; H04W 12/0431; H04W 12/069; H04W 12/041; H04L 29/00; H04L 29/06; H04L 63/061; H04L 63/166
(Continued)

(56) References Cited

U.S. PATENT DOCUMENTS

2004/0161110 A1  8/2004  Kanai et al.
2010/0031042 A1*  2/2010  Di Crescenzo ....... H04L 9/3273
                                                     713/169

(Continued)

FOREIGN PATENT DOCUMENTS

CN  101277512 A  10/2008
CN  101567784 A  10/2009

(Continued)

OTHER PUBLICATIONS

Dierks, T. et al., The Transport Layer Security (TLS) Protocol Version 1.2, RFC 5246, pp. 1-104, Aug. 2008.

(Continued)

*Primary Examiner* — Michael S McNally
(74) *Attorney, Agent, or Firm* — Leydig, Voit & Mayer, Ltd.

(57) ABSTRACT

This application discloses an identity authentication method, a device, and a system. The method includes: obtaining a first master public key and a first private key from a key generation center; sending a ClientHello message; obtaining a second identity from a ServerKeyExchange message; generating a pre-shared key of a selected PSK mode by using the second identity, the first private key, and the first master public key; and completing identity authentication with a second device by using the pre-shared key. According to the method, device, and system provided in embodiments of this application, an identity can be transmitted by using information in the TLS protocol, without extending the TLS protocol. This can avoid a compatibility problem caused by TLS protocol extension.

15 Claims, 11 Drawing Sheets

(51) Int. Cl.
*H04L 29/00* (2006.01)
*H04W 12/041* (2021.01)
*H04W 12/069* (2021.01)
*H04W 12/0431* (2021.01)

(52) U.S. Cl.
CPC .......... *H04L 63/061* (2013.01); *H04L 63/166* (2013.01); *H04W 12/041* (2021.01); *H04W 12/0431* (2021.01); *H04W 12/069* (2021.01)

(58) Field of Classification Search
USPC ........................................................ 713/171
See application file for complete search history.

(56) References Cited

U.S. PATENT DOCUMENTS

2010/0325436 A1 12/2010 Huang et al.
2012/0042160 A1 2/2012 Nakhjiri et al.
2014/0143855 A1 5/2014 Keoh et al.
2017/0272945 A1* 9/2017 Link, II ................ H04L 9/3242

FOREIGN PATENT DOCUMENTS

| CN | 103581167 A | 2/2014 |
| CN | 103765842 A | 4/2014 |
| CN | 104735037 A | 6/2015 |
| CN | 105978906 A | 9/2016 |
| CN | 106060070 A | 10/2016 |
| EP | 2271025 A1 | 1/2011 |

OTHER PUBLICATIONS

Groves, M., Elliptic Curve-Based Certificateless Signatures for Identity-Based Encryption (ECCSI), RFC6507, pp. 1-17, Feb. 2012.
Eronen, P. et al., Pre-Shared Key Ciphersuites for Transport Layer Security (TLS), RFC 4279, pp. 1-15, Dec. 2005.

* cited by examiner

IDENTITY AUTHENTICATION METHOD, DEVICE, AND SYSTEM

CROSS-REFERENCE TO RELATED APPLICATIONS

This application is a continuation of International Application No. PCT/CN2017/092900, filed on Jul. 14, 2017, which claims priority to Chinese Patent Application No. 201611052569.8, filed on Nov. 24, 2016. The disclosures of the aforementioned applications are hereby incorporated by reference in their entireties.

TECHNICAL FIELD

Embodiments of this application relate to the communications field, and in particular, to an identity authentication method, a device, and a system.

BACKGROUND

A non-interactive key negotiation technology is a technology used for generating a pre-shared key by two communication parties. Being different from conventional key negotiation, non-interactive key negotiation can implement the following: The two communication parties can generate, when not exchanging information, a same pre-shared key by using their own key information and public information of the other party. Identity-based non-interactive key negotiation is a special type of key negotiation. The technology is a key negotiation protocol that uses an identity-based cipher as a basis. Public information of the two communication parties is identities of the two communication parties, for example, email addresses, IP addresses, and domain names.

In an Internet of Things scenario, regardless of communication between terminal devices or communication between a terminal device and a server, all of a cipher algorithm protocol, authentication and key negotiation, and the like between two communication parties need to be implemented by using the Transport Layer Security (TLS) protocol. Therefore, in the Internet of Things scenario, if the two communication parties need to perform identity-based non-interactive key negotiation, both the two communication parties need to send their identities to each other by using information stipulated in the TLS protocol, to complete identity authentication.

The two communication parties usually may send the identities by using a ClientHello message and a ServerHello message stipulated in the TLS protocol. In other words, the terminal device may send an identity of the terminal device to the server by using the ClientHello message, and the server may send an identity of the server by using the ServerHello message. However, for transmitting the identities by using the ClientHello message and the ServerHello message, new fields need to be added to the ClientHello message and the ServerHello message. In other words, the TLS protocol supported by the terminal device and a network device needs to be extended. Because there is a large quantity of terminal devices in the Internet of Things, extending the TLS protocol that is supported by the terminal device and the network device may cause a compatibility problem to a process of identity authentication between devices.

SUMMARY

This application provides an identity authentication method, a device, and a system, so that two communication parties can send identities by using messages stipulated in the TLS protocol, and a compatibility problem caused by TLS protocol extension to an identity authentication process can be avoided.

According to a first aspect, this application provides an identity authentication method. The method includes: obtaining, by a first device from a key generation center, a first master public key and a first private key that is corresponding to a first identity, where the first identity is an identity of the first device; sending, by the first device, a Transport Layer Security TLS client hello ClientHello message, where the ClientHello message carries cipher suites of candidate pre-shared key PSK modes; obtaining, by the first device, the second identity from a TLS server key exchange ServerKeyExchange message, where the second identity is an identity of a second device; generating, by the first device, a pre-shared key of a selected PSK mode by using the second identity, the first private key, and the first master public key, where the selected PSK mode is one mode selected by the second device from the candidate PSK modes; and completing, by the first device, identity authentication with the second device by using the pre-shared key.

With reference to the first aspect, in a first possible implementation of the first aspect, the first device sends a TLS client key exchange ClientKeyExchange message, where the ClientKeyExchange message carries the first identity.

With reference to the first aspect or the first possible implementation of the first aspect, in a second possible implementation of the first aspect, the obtaining, by the first device, the second identity from a TLS server key exchange ServerKeyExchange message includes: obtaining, by the first device, the second identity and a second master public key from the ServerKeyExchange message.

With reference to the first aspect or the first possible implementation of the first aspect, in a third possible implementation of the first aspect, the obtaining, by the first device, the second identity from a TLS server key exchange ServerKeyExchange message includes: obtaining, by the first device, candidate identities of the second device from the ServerKeyExchange message; and selecting, by the first device, one from the candidate identities as the second identity.

With reference to the first aspect or the first possible implementation of the first aspect, in a fourth possible implementation of the first aspect, the obtaining, by the first device, the second identity from a TLS server key exchange ServerKeyExchange message includes: obtaining, by the first device from the ServerKeyExchange message, candidate identities of the second device and a candidate master public key corresponding to each candidate identity; and selecting, by the first device, the second identity from the candidate identities, where a candidate master public key corresponding to the second identity is the same as the first master public key.

With reference to the second possible implementation of the first aspect, in a fifth possible implementation of the first aspect, the generating, by the first device, a pre-shared key of a selected PSK mode by using the second identity, the first private key, and the first master public key includes: if the second master public key is the same as the first master public key, generating, by the first device, the pre-shared key of the selected PSK mode by using the second identity, the first private key, and the first master public key.

With reference to the second possible implementation of the first aspect, in a sixth possible implementation of the first aspect, the sending, by the first device, a TLS client key exchange ClientKeyExchange message, where the ClientKeyExchange message carries the first identity includes: sending, by the first device, the ClientKeyExchange message, where the ClientKeyExchange message carries the first identity and the first master public key.

With reference to the third or the fourth possible implementation of the first aspect, in a seventh possible implementation of the first aspect, the sending, by the first device, a TLS client key exchange ClientKeyExchange message, where the ClientKeyExchange message carries the first identity includes: sending, by the first device, the ClientKeyExchange message, where the ClientKeyExchange message carries the first identity and the second identity.

With reference to the third or the fourth possible implementation of the first aspect, in an eighth possible implementation of the first aspect, the sending, by the first device, a TLS client key exchange ClientKeyExchange message, where the ClientKeyExchange message carries the first identity includes: sending, by the first device, the ClientKeyExchange message, where the ClientKeyExchange message carries the first identity and indication information of the second identity.

According to a second aspect, this application further provides another identity authentication method, including: obtaining, by a second device from a key generation center, a second master public key and a second private key that is corresponding to a second identity, where the second identity is an identity of the second device; sending, by the second device, a Transport Layer Security TLS server hello ServerHello message, where the ServerHello message carries a cipher suite of a selected PSK mode; obtaining, by the second device, a first identity from a TLS client key exchange ClientKeyExchange message, where the first identity is an identity of a first device; generating, by the second device, a pre-shared key of the selected PSK mode by using the first identity, the second private key, and the second master public key; and completing, by the second device, identity authentication with the first device by using the pre-shared key.

With reference to the second aspect, in a first possible implementation of the second aspect, the second device sends a TLS server key exchange ServerKeyExchange message, where the ServerKeyExchange message carries the second identity.

With reference to the second aspect or the first possible implementation of the second aspect, in a second possible implementation of the second aspect, the obtaining, by a second device from a key generation center, a second master public key and a second private key that is corresponding to a second identity includes: obtaining, by the second device, the second master public key and candidate private keys from the key generation center, where each candidate private key is corresponding to one candidate identity of the second device.

With reference to the second aspect or the first possible implementation of the second aspect, in a third possible implementation of the second aspect, the obtaining, by a second device from a key generation center, a second master public key and a second private key that is corresponding to a second identity includes: obtaining, by the second device, candidate master public keys and candidate private keys from the key generation center, where each candidate private key is corresponding to one candidate master public key, and each candidate private key is corresponding to one candidate identity of the second device.

With reference to the first possible implementation of the second aspect, in a fourth possible implementation of the second aspect, the sending, by the second device, a TLS server key exchange ServerKeyExchange message, where the ServerKeyExchange message carries the second identity includes: sending, by the second device, the ServerKeyExchange message, where the ServerKeyExchange message carries the second identity and the second master public key.

With reference to the first possible implementation of the second aspect, in a fifth possible implementation of the second aspect, the sending, by the second device, a TLS server key exchange ServerKeyExchange message, where the ServerKeyExchange message carries the second identity includes: sending, by the second device, the ServerKeyExchange message, where the sent ServerKeyExchange message carries the candidate master public keys.

With reference to the third or the fourth possible implementation of the second aspect, in a sixth possible implementation of the second aspect, the sending, by the second device, a TLS server key exchange ServerKeyExchange message, where the ServerKeyExchange message carries the second identity includes: sending, by the second device, the ServerKeyExchange message, where the sent ServerKeyExchange message carries the candidate identities and the candidate master public key corresponding to each candidate identity.

With reference to the third or the fourth possible implementation of the second aspect, in a seventh possible implementation of the second aspect, the obtaining, by the second device, a first identity from a TLS client key exchange ClientKeyExchange message includes: obtaining, by the second device, the first identity and the second identity from the ClientKeyExchange message.

According to a third aspect, this application provides a communications device, including: a transceiver unit, configured to: obtain, from a key generation center, a first master public key and a first private key that is corresponding to a first identity, where the first identity is an identity of the first device; and send a Transport Layer Security TLS client hello ClientHello message, where the ClientHello message carries cipher suites of candidate pre-shared key PSK modes; and a processing unit, configured to: obtain the second identity from a TLS server key exchange ServerKeyExchange message, where the second identity is an identity of a second device; generate a pre-shared key of a selected PSK mode by using the second identity, the first private key, and the first master public key, where the selected PSK mode is one mode selected by the second device from the candidate PSK modes; and complete identity authentication with the second device by using the pre-shared key. The transceiver unit may be implemented by a processor of the communications device or by a combination of a processor and a transceiver of the communications device, and the processing unit may be implemented by the transceiver of the communications device.

With reference to the third aspect, in a first possible implementation of the third aspect, the transceiver unit is further configured to send a TLS client key exchange ClientKeyExchange message, where the ClientKeyExchange message carries the first identity.

With reference to the third aspect or the first possible implementation of the third aspect, in a second possible implementation of the third aspect, the processing unit is further configured to obtain the second identity and a second master public key from the ServerKeyExchange message.

With reference to the third aspect or the first possible implementation of the third aspect, in a third possible implementation of the third aspect, the processing unit is further configured to: obtain candidate identities of the second device from the ServerKeyExchange message; and select one from the candidate identities as the second identity.

With reference to the third aspect or the first possible implementation of the third aspect, in a fourth possible implementation of the third aspect, the processing unit is further configured to: obtain, from the ServerKeyExchange message, candidate identities of the second device and a candidate master public key corresponding to each candidate identity; and select the second identity from the candidate identities, where a candidate master public key corresponding to the second identity is the same as the first master public key.

With reference to the second possible implementation of the third aspect, in a fifth possible implementation of the third aspect, the processing unit is further configured to: if the second master public key is the same as the first master public key, generate the pre-shared key of the selected PSK mode by using the second identity, the first private key, and the first master public key.

With reference to the second possible implementation of the third aspect, in a sixth possible implementation of the third aspect, the transceiver unit is further configured to send a ClientKeyExchange message, where the ClientKeyExchange message carries the first identity and the first master public key.

With reference to the third or the fourth possible implementation of the third aspect, in a seventh possible implementation of the third aspect, the transceiver unit is further configured to send a ClientKeyExchange message, where the ClientKeyExchange message carries the first identity and the second identity.

With reference to the third or the fourth possible implementation of the third aspect, in an eighth possible implementation of the third aspect, the transceiver unit is further configured to send a ClientKeyExchange message, where the ClientKeyExchange message carries the first identity and indication information of the second identity.

According to a fourth aspect, this application further provides another communications device, including: a transceiver unit, configured to: obtain, from a key generation center, a second master public key and a second private key that is corresponding to a second identity, where the second identity is an identity of the second device; and send a Transport Layer Security TLS server hello ServerHello message, where the ServerHello message carries a cipher suite of a selected PSK mode; and a processing unit, configured to: obtain a first identity from a TLS client key exchange ClientKeyExchange message, where the first identity is an identity of a first device; generate a pre-shared key of the selected PSK mode by using the first identity, the second private key, and the second master public key; and complete identity authentication with the first device by using the pre-shared key. The transceiver unit may be implemented by a transceiver of the communications device or by a combination of a processor and a processor of the communications device, and the processing unit may be implemented by the transceiver of the communications device.

With reference to the fourth aspect, in a first possible implementation of the fourth aspect, the transceiver unit is further configured to send a Transport Layer Security TLS server key exchange ServerKeyExchange message, where the ServerKeyExchange message carries the second identity.

With reference to the fourth aspect or the first possible implementation of the fourth aspect, in a second possible implementation of the fourth aspect, the processing unit is further configured to obtain the second master public key and candidate private keys from the key generation center, where each candidate private key is corresponding to one candidate identity of the second device.

With reference to the fourth aspect or the first possible implementation of the fourth aspect, in a third possible implementation of the fourth aspect, the processing unit is further configured to obtain candidate master public keys and candidate private keys from the key generation center, where each candidate private key is corresponding to one candidate master public key, and each candidate private key is corresponding to one candidate identity of the second device.

With reference to the first possible implementation of the fourth aspect, in a fourth possible implementation of the fourth aspect, the transceiver unit is further configured to send a ServerKeyExchange message, where the ServerKeyExchange message carries the second identity and the second master public key.

With reference to the first possible implementation of the fourth aspect, in a fifth possible implementation of the fourth aspect, the transceiver unit is further configured to send a ServerKeyExchange message, where the sent ServerKeyExchange message carries the candidate master public keys.

With reference to the third or the fourth possible implementation of the fourth aspect, in a sixth possible implementation of the fourth aspect, the transceiver unit is further configured to send a ServerKeyExchange message, where the sent ServerKeyExchange message carries the candidate identities and the candidate master public key corresponding to each candidate identity.

With reference to the third or the fourth possible implementation of the fourth aspect, in a seventh possible implementation of the fourth aspect, the processing unit is further configured to obtain the first identity and the second identity from the ClientKeyExchange message.

According to a fifth aspect, this application further provides a communications system, including a key generation center, a first device, and a second device. The first device is configured to: obtain, from the key generation center, a first master public key and a first private key that is corresponding to a first identity, where the first identity is an identity of the first device; send a Transport Layer Security TLS client hello ClientHello message, where the ClientHello message carries cipher suites of candidate pre-shared key PSK modes; obtain the second identity from a TLS server key exchange ServerKeyExchange message, where the second identity is an identity of the second device; generate a pre-shared key of a selected PSK mode by using the second identity, the first private key, and the first master public key, where the selected PSK mode is one mode selected by the second device from the candidate PSK modes; and complete identity authentication with the second device by using the pre-shared key. The second device is configured to: obtain, from the key generation center, a second master public key and a second private key that is corresponding to the second identity, where the second identity is the identity of the second device; send a Transport Layer Security TLS server hello ServerHello message, where the ServerHello message carries a cipher suite of the selected PSK mode; obtain the first identity from a Transport Layer Security TLS client key exchange ClientKeyExchange message, where the first identity is the identity of the first device; generate the pre-shared key of the selected PSK mode by using the first identity, the second private key, and the second master public key; and complete identity authentication with the first device by using the pre-shared key.

By using the methods, devices, and system provided in embodiments of this application, both the first device and the second device can transmit, without extending the TLS protocol, their own identities by using information in the TLS protocol. This can avoid a compatibility problem caused by TLS protocol extension.

BRIEF DESCRIPTION OF DRAWINGS

The following briefly describes the accompanying drawings describing the embodiments.

DESCRIPTION OF EMBODIMENTS

Figure 1:
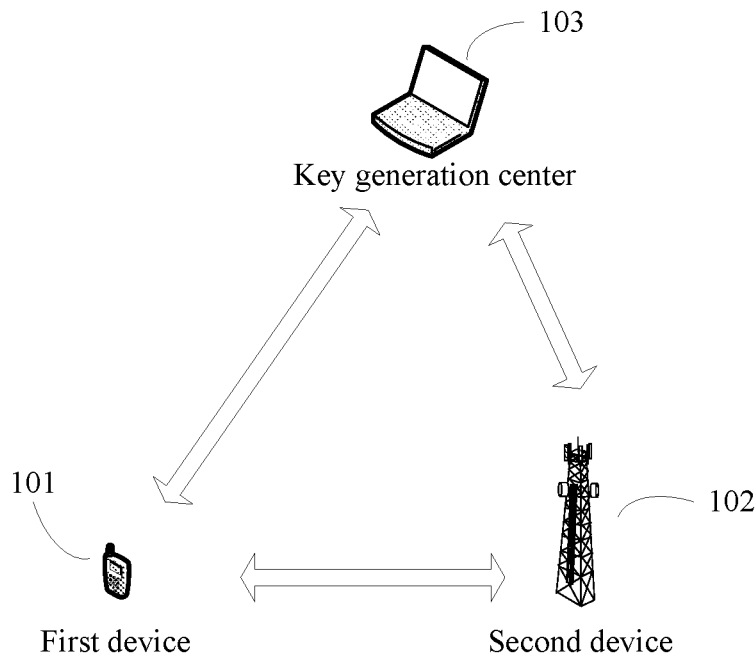
FIG. 1 is a schematic structural diagram of an embodiment of a communications system according to this application.

FIG. 1 is a schematic structural diagram of an embodiment of a communications system according to this application.

As shown in FIG. 1, the communications system may include a first device 101, a second device 102, and a key generation center 103.

The first device 101 may perform encrypted data transmission with the second device 102. A cipher algorithm protocol, an authentication process, a key negotiation process, and the like that are required during encrypted data transmission between the first device 101 and the second device 102 may all be implemented by using the TLS protocol.

The TLS protocol includes two layers: the TLS Record Protocol (TLS Record) and the TLS Handshake Protocol (TLS Handshake). The Handshake Protocol is a core part of TLS, is for implementing functions between a client and a server such as a cipher algorithm protocol, authentication, and session key generation, and is a prerequisite of secure data transmission between two communication parties. TLS supports a plurality of types of cipher suites. Cipher suites of one type are cipher suites that are based on a pre-shared key (pre-shared key cipher suites, PSK for short). TLS that supports the pre-shared key cipher suites is referred to as TLS-PSK for short. A pre-shared key used in TLS-PSK is a symmetric key. In other words, the first device 101 and the second device 102 use a same symmetric key. Based on the same pre-shared key, the first device 101 and the second device 102 complete authentication and key generation through interaction.

The first device 101 may be a terminal device. The second device 102 may be a network device, or may be a terminal device other than the first device 101. Usually, the first device 101 may be referred to as a client, and the second device 102 may be referred to as a server.

The terminal device may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) or a computer with a mobile terminal, for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE).

The network device may be a base station or an access point, or may be a device that communicates with a wireless terminal at an air interface via one or more sectors in an access network. The base station may be configured to perform conversion between a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base transceiver station (BTS) in GSM or CDMA, may be a NodeB in WCDMA, or may be an evolved NodeB (eNodeB) in LTE. This is not limited in this application.

The key generation center 103 is configured to generate public and private keys for each network device. The first device 101 and the second device 102 may separately generate a pre-shared private key by using corresponding public and private keys. Usually, the key generation center 103 may generate required public and private keys by using a bilinear pairing technology or a Schnorr signature technology.

A manner of generating, by the key generation center 103 by using the bilinear pairing technology, a master public key and a private key that is corresponding to an identity may be as follows:

The key generation center 103 first generates two cyclic groups $G_1$ and $G_2$ of order q, and a bilinear pair $e:G_1 \times G_2 \rightarrow G_2$, where q is a large prime number; randomly selects a generator P of the $G_1$ group and a random number $s \in Z_q^*$; then calculates $P_{pub}$, where $P_{pub}=sP$; and then selects two hash functions, $H_1: \{0,1\}^* \rightarrow G_2^*$ and $H_2:G_2^* \rightarrow \{0,1\}^n$, where n is a key length. In this way, a master public key $mpk=<q,G_1,G_2,e,n,P,P_{pub},H_1,H_2>$ and a master private key $msk=s \in Z_q^*$ can be obtained. After the master private key is determined, the key generation center 103 may generate, on a basis of the master private key, a private key corresponding to each identity. $SK_i=sH_1(ID_i)$, where s is the master private key, $H_1$ is the hash function, and $ID_i$ is an identity. In other words, a product of the master private key and a hash value of the identity is a private key corresponding to the identity. The identity may include a first identity, a second identity, or a candidate identity.

A manner of generating, by the key generation center 103 by using the Schnorr signature technology, a master public key and a private key that is corresponding to an identity may be as follows:

The key generation center 103 first generates a cyclic group G of order q, where q is a large prime number; then selects a generator g of G; selects a hash function $H:\{0,1\}^* \to \{0,1\}^l$, where l is a specific integer; then selects a random number $s \in Z_q^*$; and calculates a result of $y=g^s$. In this way, a master public key $mpk=<q,G,y,H>$ and a master private key $msk=s \in Z_q^*$ can be obtained. After the master private key is determined, the key generation center 103 may generate, on a basis of the master private key, a private key corresponding to each identity. $SK_i=s_i$, where $s_i=r_i+sH(R_i, ID_i) \mod q$, $R_i=g^{r_i} \mod q$, $r_i \in Z_q^*$ is the random number, and $ID_i$ is an identity. The identity may include a first identity, a second identity, or a candidate identity.

The following describes an identity authentication method in this application with reference to the accompanying drawings. The authentication method may be used to implement identity authentication between the first device 101 and the second device 102.

Figure 2:
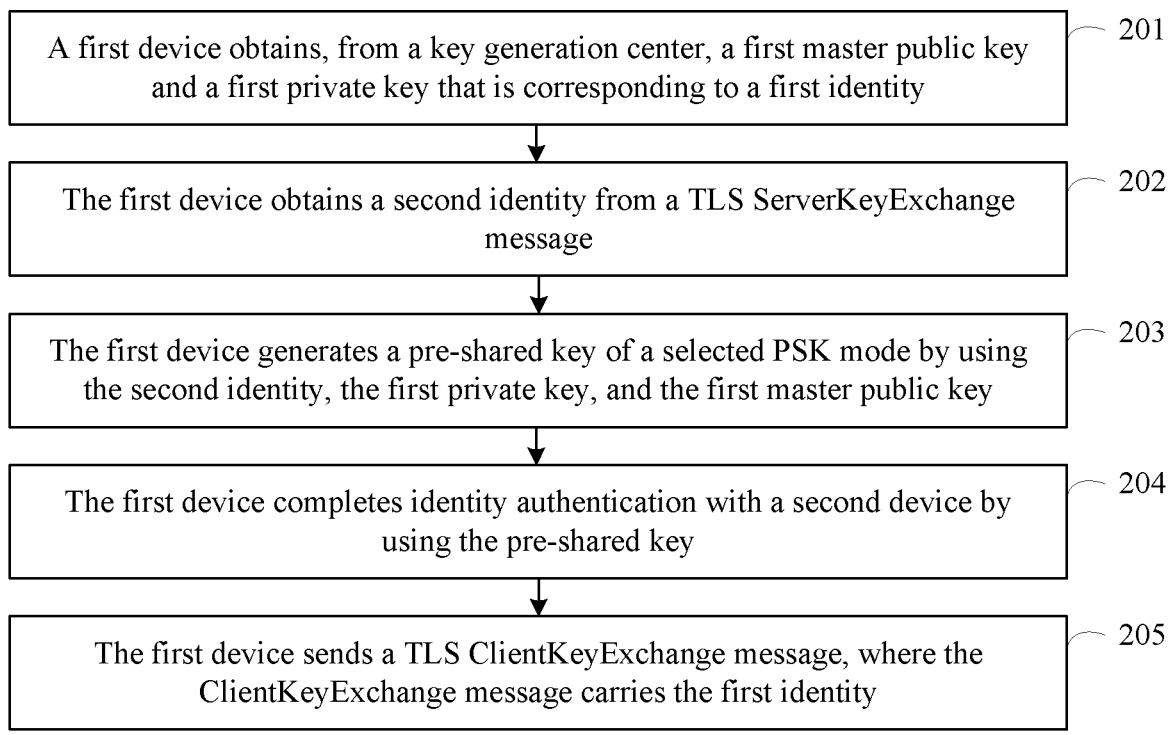
FIG. 2 is a flowchart of an embodiment of an identity authentication method according to this application.

FIG. 2 is a schematic flowchart of another embodiment of an identity authentication method according to this application.

Step 201: A first device obtains, from a key generation center, a first master public key and a first private key that is corresponding to a first identity, where the first identity is an identity of the first device.

For a manner of generating the first master public key and the first private key, refer to the foregoing description, and details are not described herein again.

Step 202: The first device obtains the second identity from a TLS server key exchange ServerKeyExchange message, where the second identity is an identity of a second device.

The ServerKeyExchange message may directly carry the second identity, or may carry a plurality of candidate identities of the second device. If the ServerKeyExchange message carries a plurality of candidate identities, the first device may select one from the candidate identities as the second identity.

In addition to the second identity or the candidate identities, the ServerKeyExchange message may further carry at least one public key, so that the first device can select the second identity from the candidate identities. The public key carried in the ServerKeyExchange message may be only a second master public key corresponding to the second identity, or may be a plurality of candidate master public keys. When there is a plurality of candidate master public keys, each candidate master public key is corresponding to one candidate identity carried in the ServerKeyExchange message. The second identity is the identity of the second device.

Step 203: The first device generates a pre-shared key of a selected PSK mode by using the second identity, the first private key, and the first master public key.

After the second identity, the first private key, and the first master public key are all determined, the first device may generate the pre-shared key by using the second identity, the first private key, and the first master public key. The first device may generate the pre-shared key by using a bilinear pairing technology or a Schnorr signature technology.

Step 204: The first device completes identity authentication with the second device by using the pre-shared key.

Details about a specific process in which the first device completes identity authentication with the second device by using the pre-shared key are not described herein.

To make the second device also able to generate the pre-shared key, in addition to the foregoing step 201 to step 204, the method may further include the following step:

Step 205: The first device sends a TLS client key exchange ClientKeyExchange message, where the ClientKeyExchange message carries the first identity.

In addition to carrying the first identity, based on content carried in the ServerKeyExchange message, the ClientKeyExchange message may also carry corresponding content.

If the ServerKeyExchange message carries the second identity and the second master public key, the ClientKeyExchange message may carry the first identity and the first master public key.

If the ServerKeyExchange message carries the candidate identities, the ClientKeyExchange message may carry the first identity and the second identity. The second identity may alternatively be replaced by indication information of the second identity.

If the ServerKeyExchange message also carries, in addition to the candidate identities, a candidate master public key corresponding to each candidate identity, the ClientKeyExchange message may also carry the second master public key in addition to the first identity and the second identity.

When the ClientKeyExchange message needs to carry the first identity, and the first master public key or the second master public key, each of the first identity, and the first master public key or the second master public key may be carried by a field that is in the ClientKeyExchange message and that can be specified by an application layer, for example, a psk_identity field.

It should be noted herein that a sequence of performing step 205 and steps 201 to 204 is not limited in this application.

By using methods and devices provided in the embodiments of this application, the first device can obtain the second identity and send the first identity by using information stipulated in the TLS protocol, thereby completing pre-shared key negotiation without extending the TLS protocol. This avoids a compatibility problem caused by TLS protocol extension.

Figure 3:
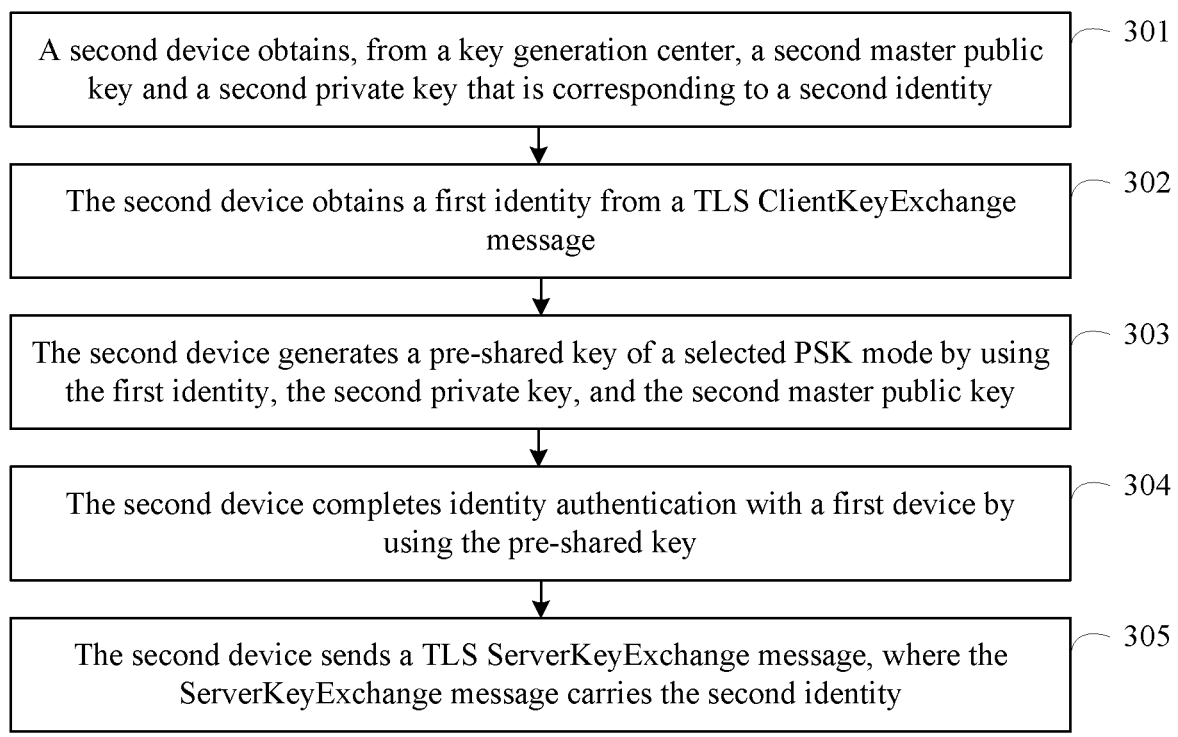
FIG. 3 is a schematic structural diagram of another embodiment of an identity authentication method according to this application.

FIG. 3 is a schematic flowchart of another embodiment of an identity authentication method according to this application.

Step 301: A second device obtains, from a key generation center, a second master public key and a second private key that is corresponding to a second identity, where the second identity is an identity of the second device.

For a manner of generating the second master public key and the second private key, refer to the foregoing description, and details are not described herein again.

Step 302: The second device obtains a first identity from a TLS client key exchange ClientKeyExchange message, where the first identity is an identity of a first device.

Step 303: The second device generates a pre-shared key by using the first identity, the second private key, and the second master public key.

The second device may obtain the second identity directly from the key generation center. Alternatively, when the second identity is selected by the first device from candidate identities, the second device may obtain the second identity from the ClientKeyExchange message. Correspondingly, the second device may also obtain the second master public key from the ClientKeyExchange message.

Step 304: The second device completes identity authentication with the first device by using the pre-shared key.

Details about a specific process in which the second device completes identity authentication with the first device by using the pre-shared key are not described herein.

To make the first device also able to generate the pre-shared key, in addition to the foregoing step 301 to step 304, the method may further include the following step:

Step 305: The second device sends a Transport Layer Security TLS server key exchange ServerKeyExchange message, where the ServerKeyExchange message carries the second identity.

The ServerKeyExchange message may directly carry the second identity, or may carry a plurality of candidate identities, so that the first device can select the second identity from the candidate identities. In addition to the second identity or the candidate identities, the ServerKeyExchange message may further carry the second master master key corresponding to the second identity, or a candidate public key corresponding to each candidate identity.

When the ServerKeyExchange message needs to carry the second identity, the second master public key, and the candidate identities or the candidate master public keys, each of the second identity, the second master public key, and the candidate identities or the candidate master public keys may be carried by a field that is in the ServerKeyExchange and that can be specified by an application layer, for example, a psk_identity_hint field.

It should be noted herein that a sequence of performing step 305 and steps 301 to 304 is not limited in this application.

By using methods and devices provided in the embodiments of this application, the second device can obtain the first identity and send the second identity by using information stipulated in the TLS protocol, thereby completing pre-shared key negotiation without extending the TLS protocol. This avoids a compatibility problem caused by TLS protocol extension.

The following further describes an identity authentication method in this application with reference to the accompanying drawings.

Figure 4A:
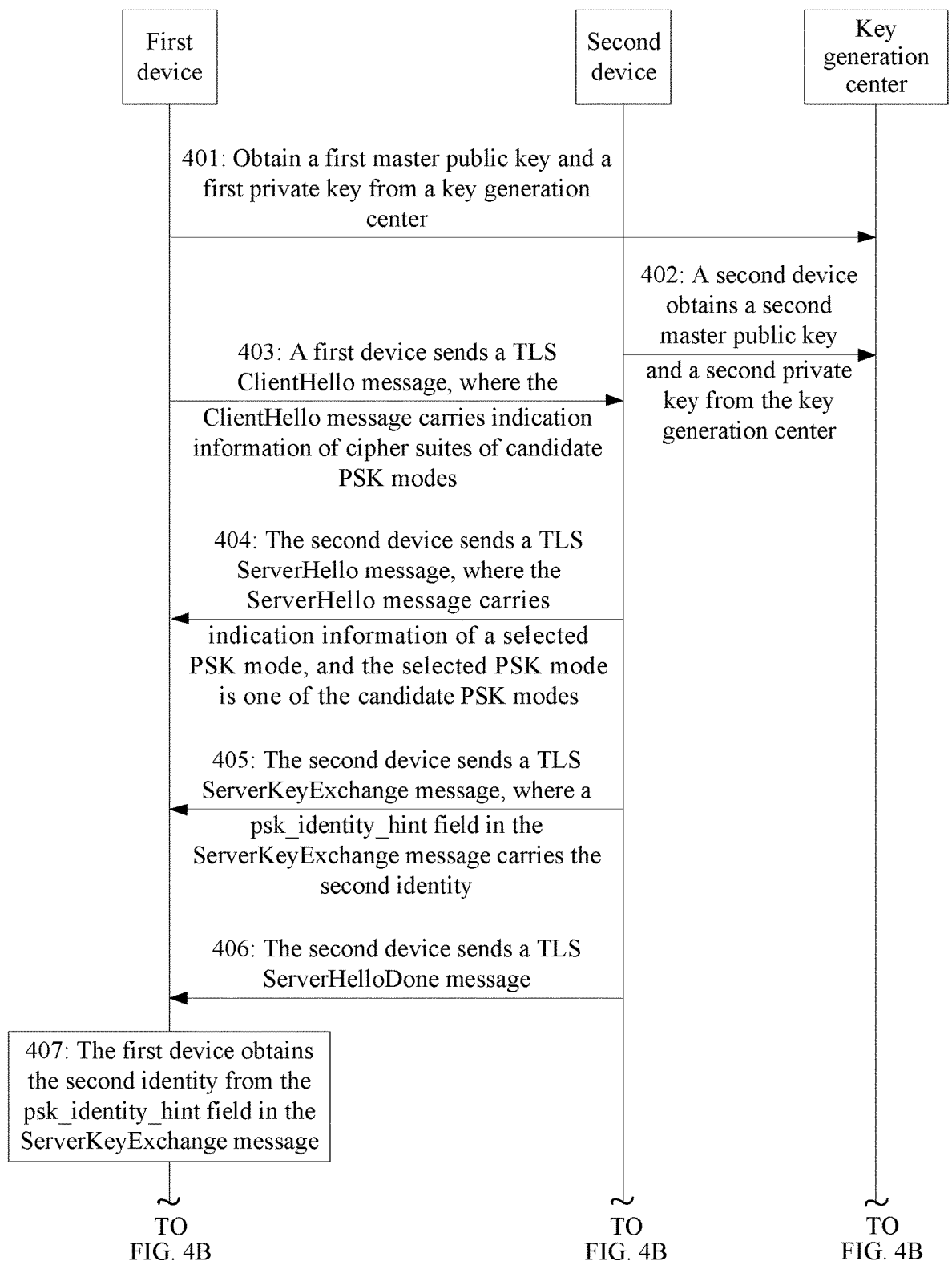
FIG. 4A and FIG. 4B are schematic structural diagrams of another embodiment of an identity authentication method according to this application.
Figure 4B:
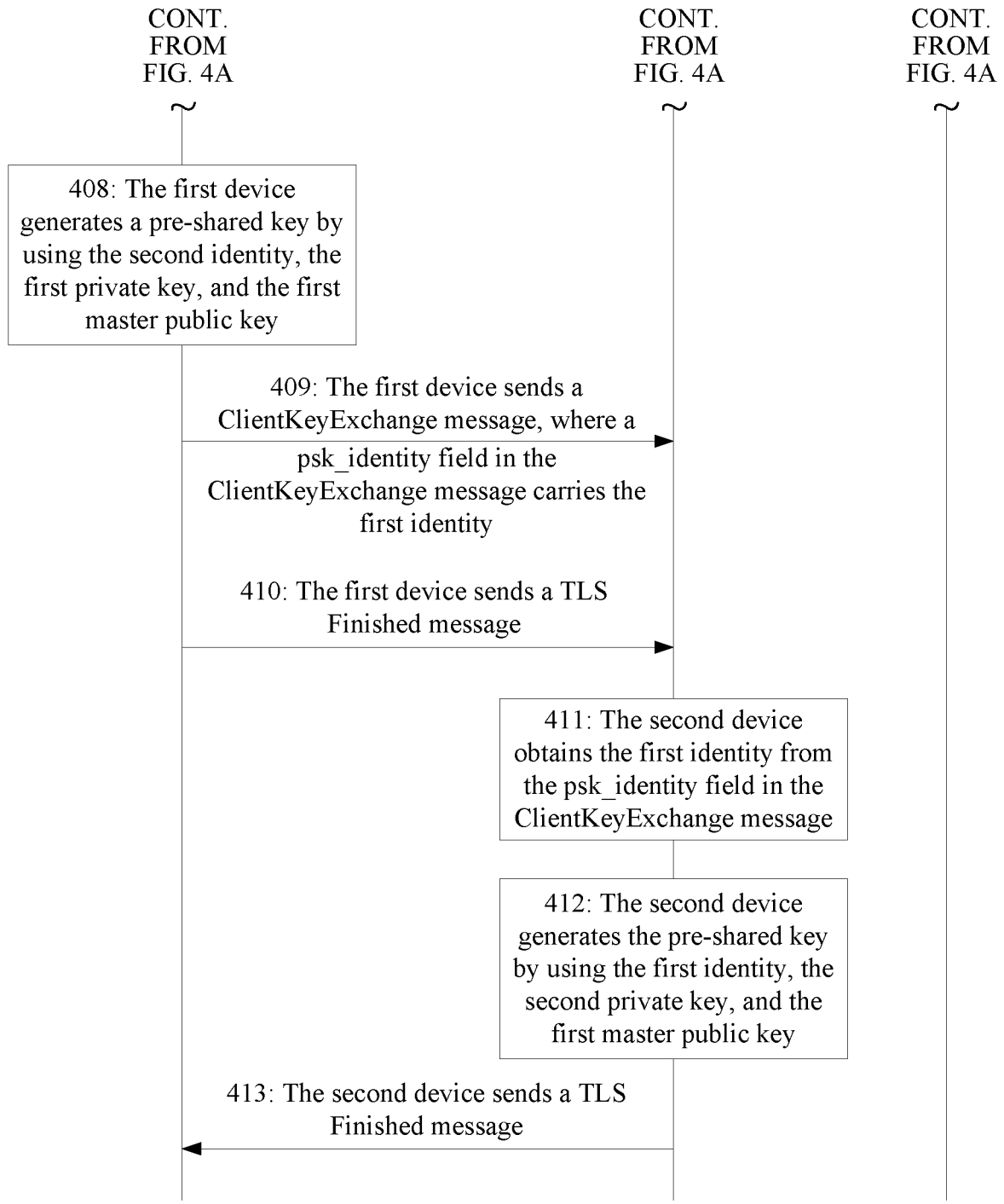

FIG. 4A and FIG. 4B are schematic flowcharts of another embodiment of an identity authentication method according to this application.

Step 401: A first device obtains, from a key generation center, a first master public key and a first private key that is corresponding to a first identity.

Step 402: A second device obtains, from the key generation center, a second master public key and a second private key that is corresponding to a second identity.

The key generation center may generate, by using a bilinear pairing (Bilinear Pairing) technology or a Schnorr signature technology, the first private key that is corresponding to the first identity and the second private key that is corresponding to the second identity. The first master public key and the second master public key may be a same master public key. The first identity may be an email address, an IP address, a domain name, or the like of the first device. The second identity may also be an email address, an IP address, a domain name, or the like of the second device. For a manner of generating the first private key and the second private key, refer to the foregoing description, and details are not described herein again.

Step 403: The first device sends a TLS ClientHello message.

The TLS ClientHello message may carry indication information of cipher suites of candidate PSK modes. The cipher suites of the candidate PSK modes are cipher suites of PSK modes supported by the first device.

For example, the TLS ClientHello message may carry information such as TLS_PSK_WITH_AES_256_CBC_SHA, TLS_DHE_PSK_WITH_AES_256_CBC_SHA, or TLS_RSA_PSK_WITH_AES_256_CBC_SHA, used to indicate that the first device supports a corresponding cipher suite.

Step 404: The second device sends a TLS ServerHello message.

After receiving the TLS ClientHello message, the second device may select one from the candidate PSK modes as a selected PSK mode that is to be used when the first device and the second device perform encrypted data transmission. After the selected PSK mode is selected, the second device may send the TLS ServerHello message. The TLS ServerHello message may carry indication information used to indicate the selected PSK mode.

For example, the indication information may be TLS_PSK_WITH_AES_256_CBC_SHA, TLS_DHE_PSK_WITH_AES_256_CBC_SHA, or TLS_RSA_PSK_WITH_AES_256_CBC_SHA, or may be a number corresponding to TLS_PSK_WITH_AES_256_CBC_SHA, TLS_DHE_PSK_WITH_AES_256_CBC_SHA, or TLS_RSA_PSK_WITH_AES_256_CBC_SHA.

Step 405: The second device sends a ServerKeyExchange message.

A psk_identity_hint field in the ServerKeyExchange message may carry the second identity.

Step 406: The second device sends a TLS ServerHelloDone message.

Step 407: The first device obtains the second identity from the psk_identity_hint field in the ServerKeyExchange message.

Step 408: The first device generates a pre-shared key by using the second identity, the first private key, and the first master public key.

The first device may calculate the pre-shared key by using content directly added to TLS implementation source code in openssl open-source code. Alternatively, the first device may calculate the pre-shared key at an application layer by using a specified callback function in a TLS-PSK mode of openssl source code. In other words, the first device may calculate the pre-shared key by using application-layer callback functions such as SSL_CTX_setpsk_client_callback( ) and SSL_CTX_setpsk_server_callback( ).

If the pre-shared key is generated by using the bilinear pairing (Bilinear Pairing) technology, a calculation method for generating the pre-shared key by the first device may be as follows:

$$psk = e(SK_A, H_1(ID_B)) = e(sH_1(ID_A), H_1(ID_B)) = e(H_1(ID_A), H_1(ID_B))^S$$

If the pre-shared key is generated by using the Schnorr signature technology, a calculation method for generating the pre-shared key by the first device may be as follows:

$$psk = (R_A{}^{H(R_A,ID_A)})^{SK_B} \bmod q = g^{SK_A SK_B} \bmod q$$

Step 409: The first device sends a ClientKeyExchange message.

A psk_identity field in the ClientKeyExchange message may carry the first identity.

Step 410: The first device sends a TLS Finished message.

Step 411: The second device obtains the first identity from the psk_identity field in the ClientKeyExchange message.

Step 412: The second device generates the pre-shared key by using the first identity, the second private key, and the first master public key.

The second device may calculate the pre-shared key by using content directly added to TLS implementation source code in openssl open-source code. Alternatively, the second device may calculate the pre-shared key at an application layer by using a specified callback function in a TLS-PSK mode of openssl source code. In other words, the second device may calculate the pre-shared key by using application-layer callback functions such as SSL_CTX_setpsk_client_callback( ) and SSL_CTX_setpsk_server_callback( ).

If the pre-shared key is generated by using the bilinear pairing (Bilinear Pairing) technology, a calculation method for generating the pre-shared key by the second device may be as follows:

$$psk=e(SK_B,H_1(ID_A))=e(sH_1(ID_B),H_1(ID_A))=e(H_1(ID_B),H_1(ID_A))^S$$

If the pre-shared key is generated by using the Schnorr signature technology, a calculation method for generating the pre-shared key by the second device may be as follows:

$$psk=(R_B y^{H(R_B,ID_B)})^{SK_A} \bmod q = g^{SK_B SK_A} \bmod q$$

Step 413: The second device sends a TLS Finished message.

According to this embodiment, the first identity may be transmitted by using the psk_identity field, and the second identity may be transmitted by using the psk_identity_hint field. In addition, according to the TLS protocol, the psk_identity_hint field and the psk_identity field may be specified by the application layer. Therefore, an identity may be transmitted on a basis of conforming to a provision in a TLS standard.

Figure 5A:
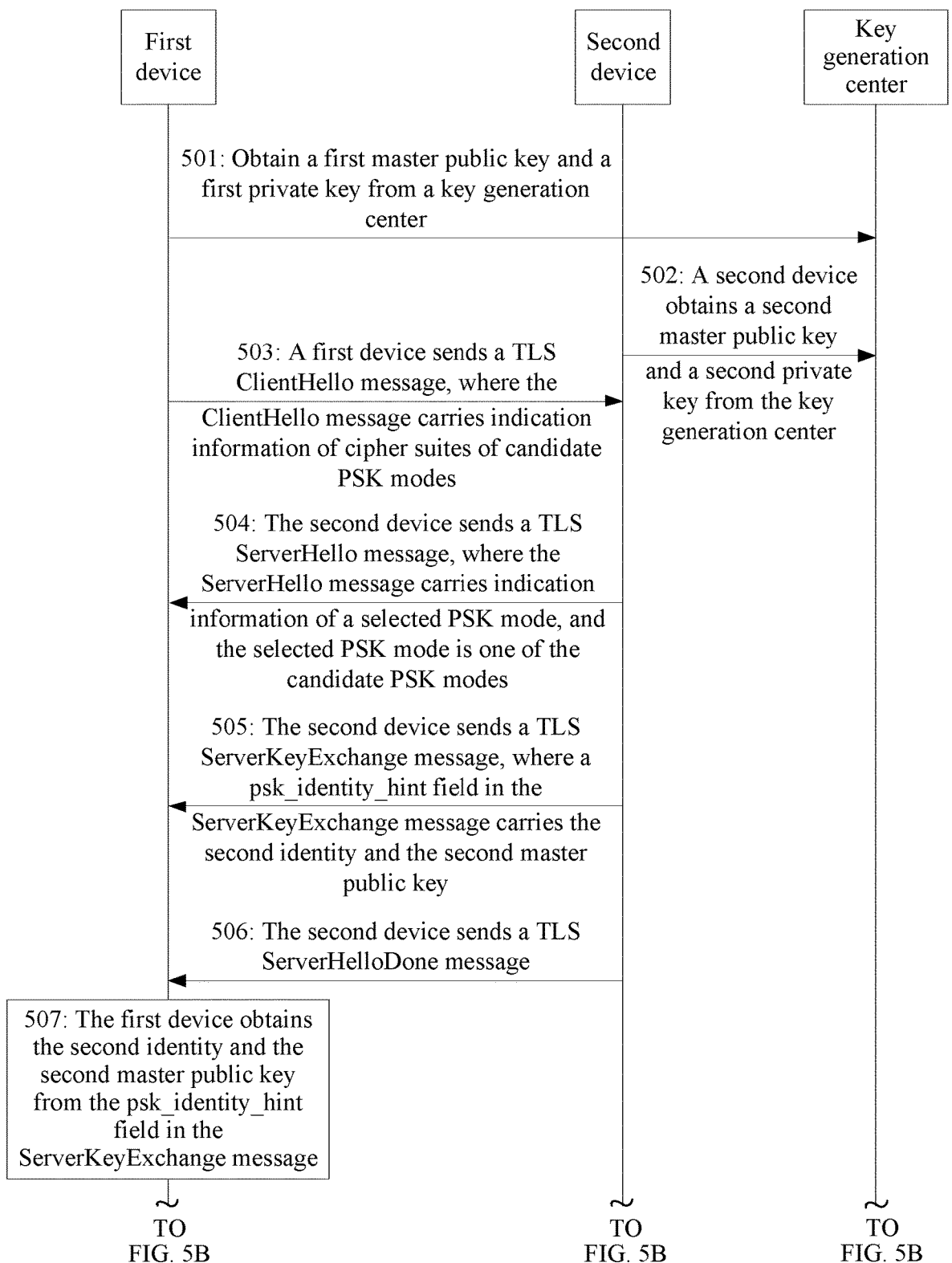
FIG. 5A and FIG. 5B are schematic structural diagrams of another embodiment of an identity authentication method according to this application.
Figure 5B:
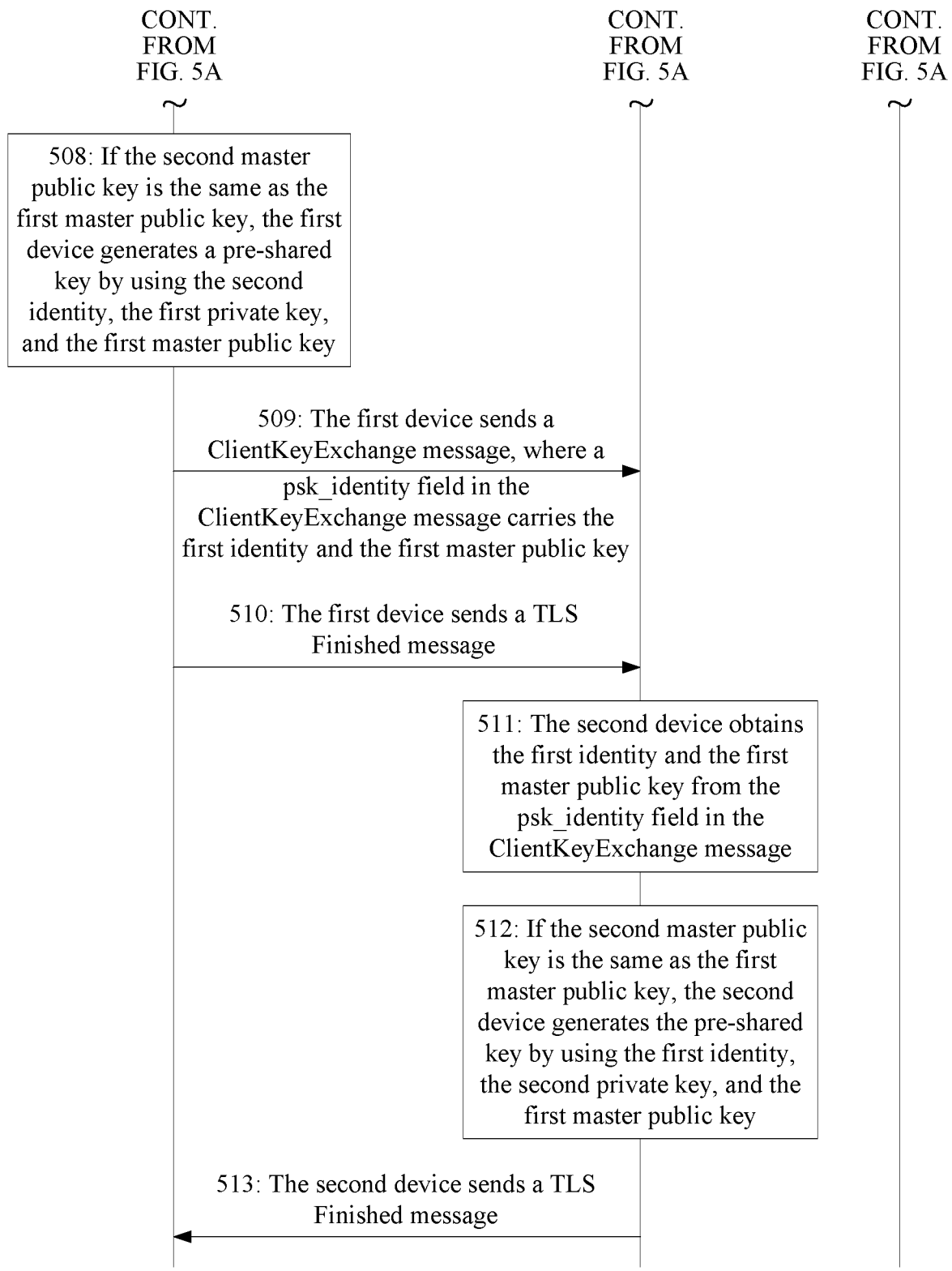

FIG. 5A and FIG. 5B are schematic flowcharts of another embodiment of an identity authentication method according to this application. In actual use, a first device may need to communicate with a plurality of second devices, and a second device may communicate with a plurality of first devices. If the first device and the second device use different master public keys, a communication failure occurs between the first device and the second device. Therefore, alternatively, the second device may send a second master public key or the first device may send a first master public key, to avoid the communication failure that occurs because the first device and the second device use different master public keys. A specific implementation may be as follows.

Step 501: A first device obtains a first master public key and a first private key from a key generation center.

Step 502: A second device obtains a second master public key and a second private key from the key generation center.

Step 503: The first device sends a TLS ClientHello message.

Step 504: The second device sends a TLS ServerHello message.

Step 505: The second device sends a ServerKeyExchange message.

A psk_identity_hint field in the ServerKeyExchange message may carry a second identity and the second master public key.

Alternatively, a psk_identity_hint field in the ServerKeyExchange message may carry the second identity and indication information of the second master public key, for example, a serial number of the second master public key.

The first device may determine, based on the indication information of the second master public key, whether the first master public key is the same as the second master public key.

Step 506: The second device sends a TLS ServerHelloDone message.

Step 507: The first device obtains the second identity and the second master public key from the psk_identity_hint field in the ServerKeyExchange message.

Step 508: If the second master public key is the same as the first master public key, the first device generates a pre-shared key of a selected PSK mode by using the second identity, the first private key, and the first master public key.

Step 509: The first device sends a ClientKeyExchange message.

A psk_identity field in the ClientKeyExchange message may carry the first identity and the first master public key.

Step 510: The first device sends a TLS Finished message.

Step 511: The second device obtains the first identity and the first master public key from the psk_identity field in the ClientKeyExchange message.

Step 512: If the first master public key is the same as the second master public key, the second device generates the pre-shared key by using the first identity, the second private key, and the first master public key.

Step 513: The second device sends a TLS Finished message.

In a manner provided in this embodiment, the psk_identity_hint field carries the second master public key, so that the first device and the second device can determine, before communicating with each other, whether public keys used by both parties are the same, thereby avoiding the communication failure that occurs because the first device and the second device use different master public keys.

Figure 6A:
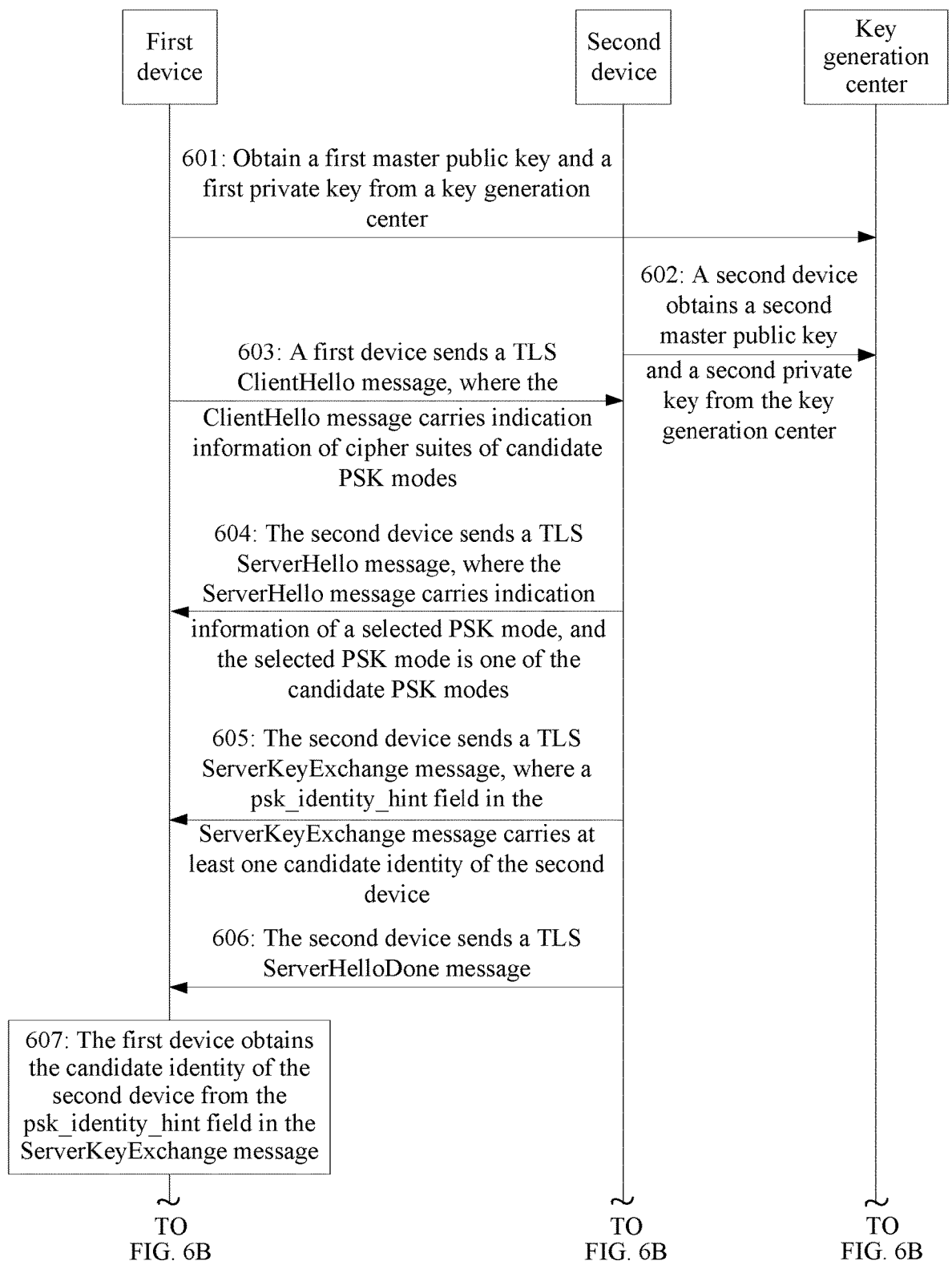
FIG. 6A and FIG. 6B are schematic structural diagrams of another embodiment of an identity authentication method according to this application.
Figure 6B:
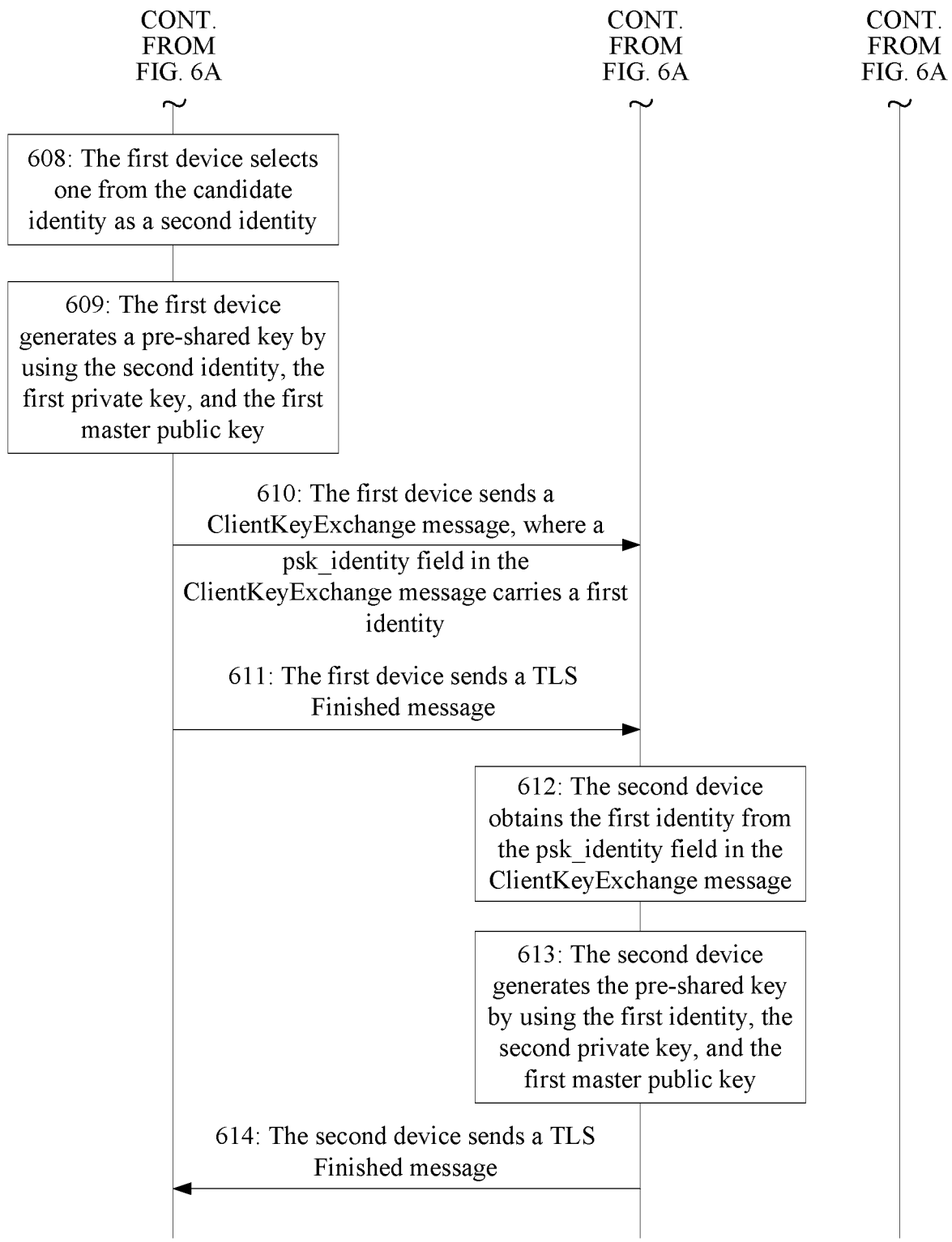

FIG. 6A and FIG. 6B are schematic flowcharts of another embodiment of an identity authentication method according to this application. In actual use, a second device may need to communicate with a first device by using different identities. When an identity of the second device is different, a private key to be used is also different. To enable the second device to communicate with the first device by using different identities, the second device may send a plurality of candidate identities to the first device. A specific implementation may be as follows.

Step 601: A first device obtains a first master public key and a first private key from a key generation center.

Step 602: A second device obtains a second master public key and n candidate private keys from the key generation center.

Each candidate private key is corresponding to one candidate identity of the second device. A value of n is a positive integer. Usually, the value of n is not less than 2.

Each candidate private key is corresponding to one candidate identity of the second device.

Step 603: The first device sends a TLS ClientHello message.

Step 604: The second device sends a TLS ServerHello message.

Step 605: The second device sends a ServerKeyExchange message.

A psk_identity_hint field in the ServerKeyExchange message carries at least one candidate identity of the second device. The candidate identity may be one or more of an email address, an IP address, a domain name, and the like of the second device.

Step 606: The second device sends a TLS ServerHelloDone message.

Step 607: The first device obtains the candidate identity from the psk_identity_hint field in the ServerKeyExchange message.

Step 608: The first device selects one from the candidate identity as a second identity.

Step 609: The first device generates a pre-shared key by using the second identity, the first private key, and the first master public key.

Step 610: The first device sends a ClientKeyExchange message.

A psk_identity field in the ClientKeyExchange message may carry the second identity and a first identity.

Step 611: The first device sends a TLS Finished message.

Step 612: The second device obtains the second identity and the first identity from the psk_identity field in the ClientKeyExchange message.

Step 613: The second device generates the pre-shared key by using the first identity, a private key corresponding to the second identity, and the first master public key.

Step 614: The second device sends a TLS Finished message.

In a manner provided in this embodiment, the psk_identity_hint field carries the candidate identity, so that the second device can communicate with the first device by using different identities.

Figure 7A:
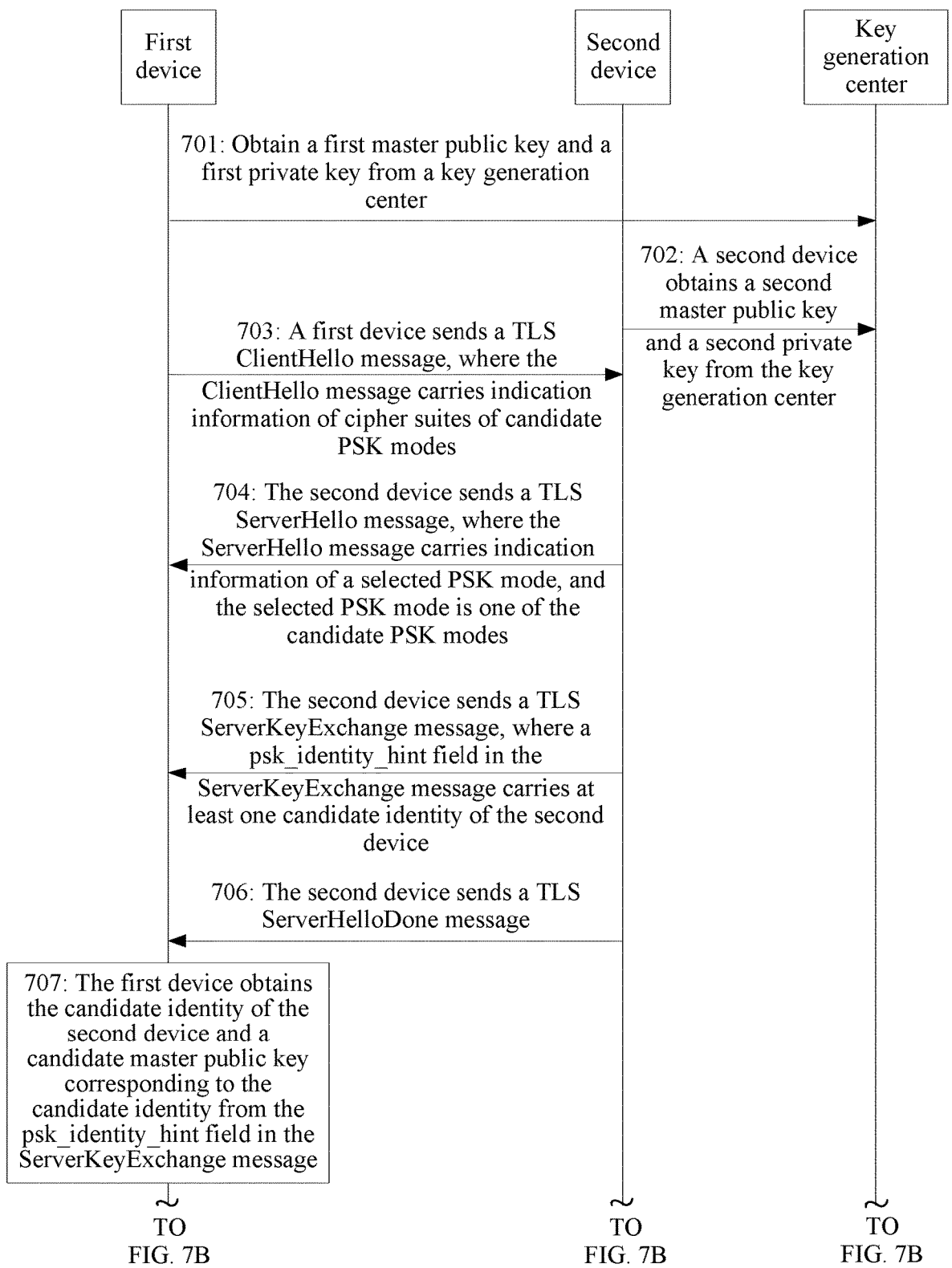
FIG. 7A and FIG. 7B are schematic structural diagrams of another embodiment of an identity authentication method according to this application.
Figure 7B:
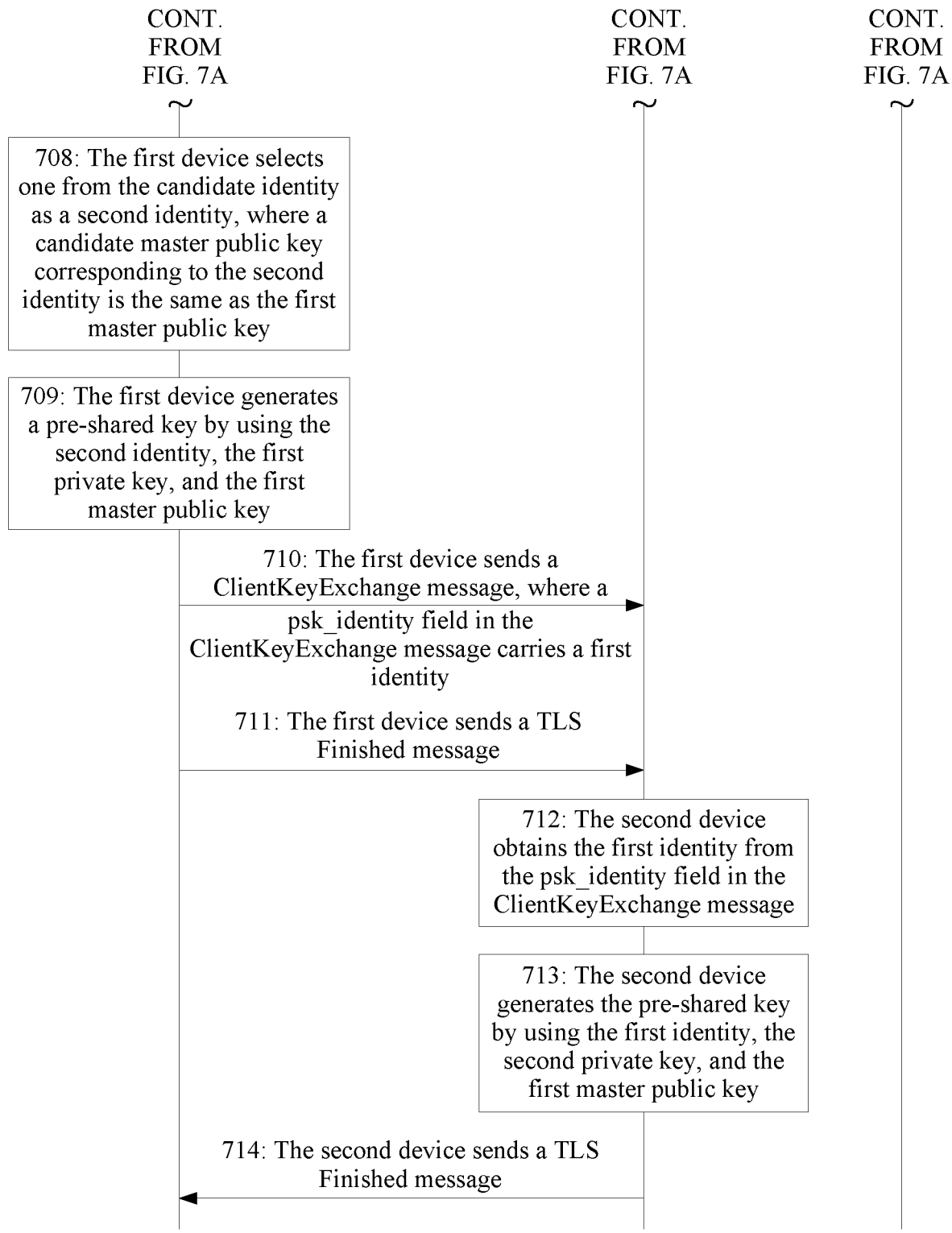

FIG. 7A and FIG. 7B are schematic flowcharts of another embodiment of an identity authentication method according to this application. In actual use, a first device may need to communicate with a first device by using different identities. When an identity of the first device is different, a private key to be used is different, and a public key to be used may also be different. To enable the second device to communicate with the first device by using different identities, the second device may send a plurality of candidate identities and a plurality of candidate master public keys to the first device. A specific implementation may be as follows.

Step 701: A first device obtains a first master public key and a first private key from a key generation center.

Step 702: A second device obtains, from the key generation center, a public key corresponding to each candidate identity and a private key corresponding to each candidate identity.

Step 703: The first device sends a TLS ClientHello message.

Step 704: The second device sends a TLS ServerHello message.

Step 705: The second device sends a ServerKeyExchange message.

A psk_identity_hint field in the ServerKeyExchange message carries at least one candidate identity of the second device and a candidate master public key corresponding to each candidate identity.

Step 706: The second device sends a TLS ServerHelloDone message.

Step 707: The first device obtains the candidate identity and the candidate master public key corresponding to the candidate identity from the psk_identity_hint field in the ServerKeyExchange message.

Step 708: The device selects a second identity from the candidate identity.

A candidate master public key corresponding to the second identity is the same as the first master public key.

Step 709: The first device generates the pre-shared key by using the second identity, the first private key, and the first master public key.

Step 710: The first device sends a ClientKeyExchange message.

A psk_identity field in the ClientKeyExchange message carries the second identity and a first identity.

In addition to the second identity, the psk_identity field may further carry a candidate master public key corresponding to the second identity.

Step 711: The first device sends a TLS Finished message.

Step 712: The second device obtains the second identity and the first identity from the psk_identity in the ClientKeyExchange message.

The second device may further obtain, from the psk_identity field, the candidate master public key corresponding to the second identity.

Step 713: The second device generates the pre-shared key by using the first identity, a candidate private key corresponding to the second identity, and the candidate master public key corresponding to the second identity.

Step 714: The second device sends a TLS Finished message.

In a manner provided in this embodiment, the psk_identity_hint field carries the candidate identity and the candidate master public key, so that the first device can communicate with the second device by using a public key that matches a public key obtained by the first device.

Figure 8:
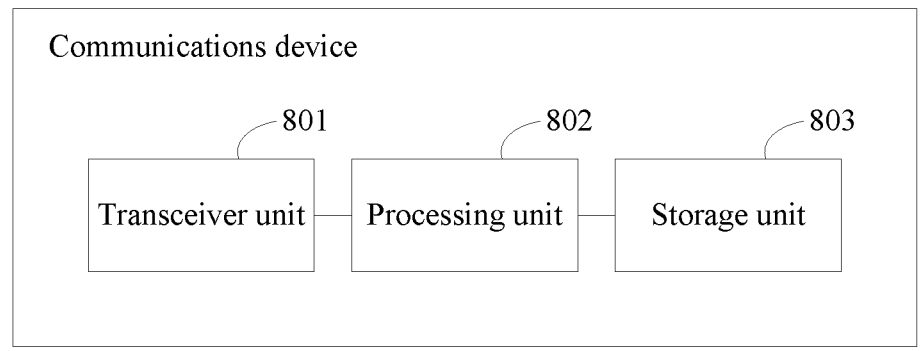
FIG. 8 is a schematic structural diagram of an embodiment of a communications device according to this application.

FIG. 8 is a schematic structural diagram of an embodiment of a communications device according to this application.

As shown in FIG. 8, the communications device may include a transceiver unit 801, a processing unit 802, and a storage unit 803. The apparatus may be the first device in the foregoing embodiments, or may be the second device in the foregoing embodiments.

When the communications device is the second device:

the transceiver unit 801 is configured to: obtain, from a key generation center, a first master public key and a first private key that is corresponding to a first identity, where the first identity is an identity of the first device; and send a Transport Layer Security TLS client hello ClientHello message, where the ClientHello message carries cipher suites of candidate pre-shared key PSK modes; and the processing unit 802 is configured to: obtain the second identity from a TLS server key exchange ServerKeyExchange message, where the second identity is an identity of a second device; generate a pre-shared key of a selected PSK mode by using the second identity, the first private key, and the first master public key, where the selected PSK mode is one mode selected by the second device from the candidate PSK modes; and complete identity authentication with the second device by using the pre-shared key.

Optionally, the transceiver unit 801 is further configured to send a TLS client key exchange ClientKeyExchange message, where the ClientKeyExchange message carries the first identity.

Optionally, the processing unit 802 is further configured to obtain the second identity and a second master public key from the ServerKeyExchange message.

Optionally, the processing unit 802 is further configured to: obtain candidate identities of the second device from the ServerKeyExchange message; and select one from the candidate identities as the second identity.

Optionally, the processing unit 802 is further configured to: obtain, from the ServerKeyExchange message, candidate identities of the second device and a candidate master public key corresponding to each candidate identity; and select the second identity from the candidate identities, where a candidate master public key corresponding to the second identity is the same as the first master public key.

Optionally, the processing unit 802 is further configured to: if the second master public key is the same as the first master public key, generate the pre-shared key of the selected PSK mode by using the second identity, the first private key, and the first master public key.

Optionally, the transceiver unit 801 is further configured to send a ClientKeyExchange message, where the ClientKeyExchange message carries the first identity and the first master public key.

Optionally, the transceiver unit 801 is further configured to send a ClientKeyExchange message, where the ClientKeyExchange message carries the first identity and the second identity.

Optionally, the transceiver unit 801 is further configured to send a ClientKeyExchange message, where the ClientKeyExchange message carries the first identity and indication information of the second identity.

When the communications device is the second device:

the transceiver unit 801 is configured to: obtain, from a key generation center, a second master public key and a second private key that is corresponding to a second identity, where the second identity is an identity of the second device; and send a Transport Layer Security TLS server hello ServerHello message, where the ServerHello message carries a cipher suite of a selected PSK mode; and the processing unit 802 is configured to: obtain a first identity from a TLS client key exchange ClientKeyExchange message, where the first identity is an identity of a first device; generate a pre-shared key of the selected PSK mode by using the first identity, the second private key, and the second master public key; and complete identity authentication with the first device by using the pre-shared key.

Optionally, the transceiver unit 801 is further configured to send a Transport Layer Security TLS server key exchange ServerKeyExchange message, where the ServerKeyExchange message carries the second identity.

Optionally, the processing unit 802 is further configured to obtain the second master public key and candidate private keys from the key generation center, where each candidate private key is corresponding to one candidate identity of the second device.

Optionally, the processing unit 802 is further configured to obtain candidate master public keys and candidate private keys from the key generation center, where each candidate private key is corresponding to one candidate master public key, and each candidate private key is corresponding to one candidate identity of the second device.

Optionally, the transceiver unit 801 is further configured to send a ServerKeyExchange message, where the ServerKeyExchange message carries the second identity and the second master public key.

Optionally, the transceiver unit 801 is further configured to send a ServerKeyExchange message, where the sent ServerKeyExchange message carries the candidate master public keys.

Optionally, the transceiver unit 801 is further configured to send a ServerKeyExchange message, where the sent ServerKeyExchange message carries the candidate identities and the candidate master public key corresponding to each candidate identity.

Optionally, the processing unit 802 is further configured to obtain the first identity and the second identity from the ClientKeyExchange message.

Figure 9:
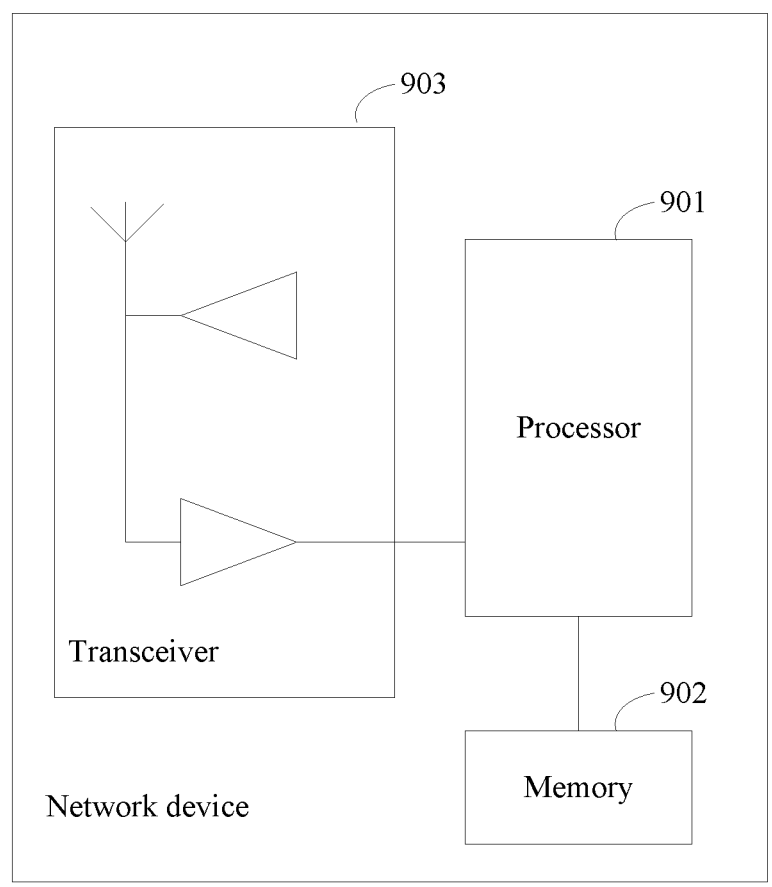
FIG. 9 is a schematic structural diagram of another embodiment of a communications device according to this application.

FIG. 9 is a schematic structural diagram of another embodiment of a communications device according to this application.

The communications device may be a communications device in any of the foregoing embodiments, and may be configured to perform any method step in the identity authentication method described in any of the embodiments in FIG. 2 to FIG. 7A and FIG. 7B.

As shown in FIG. 9, the communications device may include a processor 901, a memory 902, and a transceiver 903. The transceiver 903 may include components such as a receiver, a transmitter, and an antenna. The communications device may further include more or fewer components, or combine some components, or use a different component layout. This is not limited in this application.

The processor 901 is a control center of the communications device, is connected to each part of the entire communications device by using various interfaces and lines, and performs various functions of the communications device and/or data processing by running or executing a software program and/or a module that are/is stored in the memory 902 and by invoking data stored in the memory 902. The processor 901 may include an integrated circuit (IC). For example, the processor 901 may include a single encapsulated IC, or may include a plurality of encapsulated ICs that have same or different functions. For example, the processor 901 may include only a central processing unit (CPU), or may be a combination of a GPU, a digital signal processor (DSP), and a control chip (for example, a baseband chip) in the transceiver 903. In this implementation of this application, the CPU may include a single computing core, or may include a plurality of computing cores.

The transceiver 903 is configured to establish a communication channel, so that the communications device can connect to another communications device through the communication channel, so as to implement data transmission between the communications devices. The transceiver 903 may include a communication module such as a wireless local area network (WLAN) module, a Bluetooth module, or a baseband module, and a radio frequency (RF) circuit corresponding to the communication module, and is configured to perform wireless local area network communication, Bluetooth communication, infrared communication, and/or cellular communications system communication, for example, Wideband Code Division Multiple Access (WCDMA) and/or High Speed Downlink Packet Access (HSDPA). The transceiver 903 is configured to control communication of components in the communications device, and can support direct memory access.

In different implementations of this application, various transceivers in the transceiver 903 are usually presented in a form of an integrated circuit chip. In addition, selective combining may be performed, and not all transceivers 903 and corresponding antenna groups need to be included. For example, the transceiver 903 may include only a baseband chip, a radio frequency chip, and a corresponding antenna, so as to provide a communication function in a cellular communications system. Through a wireless communications connection established by the transceiver 903, for example, wireless local area network access or WCDMA access, the communications device may be connected to a cellular network or the Internet. In some optional implementations of this application, the communication module in the transceiver 903, for example, the baseband module, may be integrated into the processor, typically, for example, an APQ+MDM series platform. The radio frequency circuit is configured to receive and send signals during receiving and sending of information or during a call. For example, the radio frequency circuit sends downlink information received from a network device to the processor for processing, and sends uplink data to the network device. Usually, the radio frequency circuit includes a well-known circuit configured to perform these functions, including but not limited to an antenna system, a radio frequency transceiver, one or more amplifiers, a tuner, one or more oscillators, a digital signal processor, a codec chip set, a subscriber identity module (SIM) card, a memory, and the like. In addition, the radio frequency circuit may further communicate with a network and another device through wireless communication. Any communications standard or protocol may be used for the wireless communication, including but not limited to Global System for Mobile Communications (GSM), General Packet Radio Service (GPRS), Code Division Multiple Access (CDMA), Wideband Code Division Multiple Access (WCDMA), High Speed Uplink Packet Access (HSUPA), Long Term Evolution (LTE), an email, a short message service (SMS), and the like.

When the communications device is used as the first device in the foregoing embodiments:

the transceiver unit 903 is configured to: obtain, from a key generation center, a second master public key and a second private key that is corresponding to a second identity, where the second identity is an identity of a second device; and send a Transport Layer Security TLS server hello ServerHello message, where the ServerHello message carries a cipher suite of a selected PSK mode; and the processor 901 is configured to: obtain a first identity from a TLS client key exchange ClientKeyExchange message, where the first identity is an identity of the first device; generate a pre-shared key of the selected PSK mode by using the first identity, the second private key, and the second master public key; and complete identity authentication with the first device by using the pre-shared key.

Optionally, the transceiver 903 is further configured to send a TLS client key exchange ClientKeyExchange message, where the ClientKeyExchange message carries the first identity.

Optionally, the processor 901 is further configured to obtain the second identity and a second master public key from the ServerKeyExchange message.

Optionally, the processor 901 is further configured to: obtain candidate identities of the second device from the ServerKeyExchange message; and select one from the candidate identities as the second identity.

Optionally, the processor 901 is further configured to: obtain, from the ServerKeyExchange message, candidate identities of the second device and a candidate master public key corresponding to each candidate identity; and select the second identity from the candidate identities, where a candidate master public key corresponding to the second identity is the same as the first master public key.

Optionally, the processor 901 is further configured to: if the second master public key is the same as the first master public key, generate the pre-shared key of the selected PSK mode by using the second identity, the first private key, and the first master public key.

Optionally, the transceiver 903 is further configured to send a ClientKeyExchange message, where the ClientKeyExchange message carries the first identity and the first master public key.

Optionally, the transceiver 903 is further configured to send a ClientKeyExchange message, where the ClientKeyExchange message carries the first identity and the second identity.

Optionally, the transceiver 903 is further configured to send a ClientKeyExchange message, where the ClientKeyExchange message carries the first identity and indication information of the second identity.

When the communications device is the second device:

the transceiver 903 is configured to: obtain, from a key generation center, a second master public key and a second private key that is corresponding to a second identity, where the second identity is an identity of the second device; and send a Transport Layer Security TLS server hello ServerHello message, where the ServerHello message carries a cipher suite of a selected PSK mode; and the processor 901 is configured to: obtain a first identity from a TLS client key exchange ClientKeyExchange message, where the first identity is an identity of a first device; generate a pre-shared key of the selected PSK mode by using the first identity, the second private key, and the second master public key; and complete identity authentication with the first device by using the pre-shared key.

Optionally, the transceiver 903 is further configured to send a Transport Layer Security TLS server key exchange ServerKeyExchange message, where the ServerKeyExchange message carries the second identity.

Optionally, the processor 901 is further configured to obtain the second master public key and candidate private keys from the key generation center, where each candidate private key is corresponding to one candidate identity of the second device.

Optionally, the processor 901 is further configured to obtain candidate master public keys and candidate private keys from the key generation center, where each candidate private key is corresponding to one candidate master public key, and each candidate private key is corresponding to one candidate identity of the second device.

Optionally, the transceiver 903 is further configured to send a ServerKeyExchange message, where the ServerKeyExchange message carries the second identity and the second master public key.

Optionally, the transceiver 903 is further configured to send a ServerKeyExchange message, where the sent ServerKeyExchange message carries the candidate master public keys.

Optionally, the transceiver 903 is further configured to send a ServerKeyExchange message, where the sent ServerKeyExchange message carries the candidate identities and the candidate master public key corresponding to each candidate identity.

Optionally, the processor 901 is further configured to obtain the first identity and the second identity from the ClientKeyExchange message.

In specific implementation, this application further provides a computer storage medium. The computer storage medium may store a program. When the program is executed, some or all steps in the embodiments of the identity authentication method provided in this application may be included. The storage medium may be a magnetic disk, an optical disc, a read-only memory (ROM), a random access memory (RAM), or the like.

A person skilled in the art may clearly understand that a technology in the embodiments of this application may be implemented by using software in combination with a necessary universal hardware platform. Based on such an understanding, the technical solutions in the embodiments of this application essentially or the part contributing to the prior art may be represented in a form of a software product. The computer software product may be stored in a storage medium, for example, a ROM/RAM, a magnetic disk, or an optical disc, and includes one or more instructions for instructing a computer device (which may be a personal computer, a server, a network device, or the like) to perform the method described in the embodiments of this application or in some parts of the embodiments.

For same or similar parts in the embodiments in this specification, refer to these embodiments. Especially, the device and system embodiments are described relatively simply because they are basically similar to the method embodiments, and for related parts, reference may be made to descriptions in the method embodiments.

The foregoing implementations of this application do not limit the protection scope of this application.

What is claimed is:

1. An identity authentication method, comprising:
    obtaining, by a first device from a key generation center, a first master public key and a first private key that is corresponding to a first identity, wherein the first identity is an identity of the first device;
    sending, by the first device, a Transport Layer Security (TLS) client hello (ClientHello) message, wherein the ClientHello message carries cipher suites of candidate pre-shared key PSK modes;
    obtaining, by the first device, a second identity from a TLS server key exchange (ServerKeyExchange) message, wherein the second identity is an identity of a second device;
    generating, by the first device, a pre-shared key of a selected PSK mode by using the second identity, the first private key, and the first master public key, wherein the selected PSK mode is one mode selected by the second device from the candidate PSK modes; and
    completing, by the first device, identity authentication with the second device by using the pre-shared key.

2. The method according to claim 1, further comprising:
    sending, by the first device, a TLS client key exchange (ClientKeyExchange) message, wherein the ClientKeyExchange message carries the first identity.

3. The method according to claim 2, wherein the obtaining, by the first device, the second identity from the ServerKeyExchange message comprises:
    obtaining, by the first device, the second identity and a second master public key from the ServerKeyExchange message.

4. The method according to claim 3, wherein the generating, by the first device, the pre-shared key of the selected PSK mode by using the second identity, the first private key, and the first master public key comprises:
    in response to the second master public key being the same as the first master public key, generating, by the first device, the pre-shared key of the selected PSK mode by using the second identity, the first private key, and the first master public key.

5. The method according to claim 3, wherein the sending, by the first device, the ClientKeyExchange message comprises:
    sending, by the first device, the ClientKeyExchange message, wherein the ClientKeyExchange message carries the first identity and the first master public key.

6. The method according to claim 2, wherein the obtaining, by the first device, the second identity from the ServerKeyExchange message comprises:
    obtaining, by the first device, candidate identities of the second device from the ServerKeyExchange message; and
    selecting, by the first device, one from the candidate identities as the second identity.

7. The method according to claim 6, wherein the sending, by the first device, the ClientKeyExchange message comprises:
    sending, by the first device, the ClientKeyExchange message, wherein the ClientKeyExchange message carries the first identity and the second identity.

8. The method according to claim 1, wherein the obtaining, by the first device, the second identity from the ServerKeyExchange message comprises:
    obtaining, by the first device from the ServerKeyExchange message, candidate identities of the second device and a candidate master public key corresponding to each candidate identity; and
    selecting, by the first device, the second identity from the candidate identities, wherein a candidate master public key corresponding to the second identity is the same as the first master public key.

9. A communications device, comprising:
    a transceiver, configured to:
        obtain, from a key generation center, a first master public key and a first private key that is corresponding to a first identity, wherein the first identity is an identity of the communications device; and
        send a Transport Layer Security TLS client hello (ClientHello) message, wherein the ClientHello message carries cipher suites of candidate pre-shared key PSK modes; and
    a processor, configured to:
        obtain a second identity from a TLS server key exchange (ServerKeyExchange) message, wherein the second identity is an identity of a second device;
        generate a pre-shared key of a selected PSK mode by using the second identity, the first private key, and the first master public key, wherein the selected PSK mode is one mode selected by the second device from the candidate PSK modes; and
        complete identity authentication with the second device by using the pre-shared key.

10. The communications device according to claim 9, wherein
    the transceiver is further configured to send a TLS client key exchange (ClientKeyExchange) message, wherein the ClientKeyExchange message carries the first identity.

11. The communications device according to claim 9, wherein
    the processor is further configured to obtain the second identity and a second master public key from the ServerKeyExchange message.

12. The communications device according to claim 11, wherein
    the processor is further configured to: in response to the second master public key being the same as the first master public key, generate the pre-shared key of the selected PSK mode by using the second identity, the first private key, and the first master public key.

13. The communications device according to claim 9, wherein
    the processor is further configured to:
    obtain candidate identities of the second device from the ServerKeyExchange message; and
    select one from the candidate identities as the second identity.

14. The communications device according to claim 9, wherein the processor is further configured to:

obtain, from the ServerKeyExchange message, candidate identities of the second device and a candidate master public key corresponding to each candidate identity; and select the second identity from the candidate identities, wherein a candidate master public key corresponding to the second identity is the same as the first master public key.

15. A communications system, comprising a key generation center, a first device, and a second device, wherein:

the first device is configured to:

obtain, from the key generation center, a first master public key and a first private key that is corresponding to a first identity, wherein the first identity is an identity of the first device;

send a Transport Layer Security TLS client hello (ClientHello) message, wherein the ClientHello message carries cipher suites of candidate pre-shared key PSK modes;

obtain a second identity from a TLS server key exchange (ServerKeyExchange) message, wherein the second identity is an identity of the second device;

generate a pre-shared key of a selected PSK mode by using the second identity, the first private key, and the first master public key, wherein the selected PSK mode is one mode selected by the second device from the candidate PSK modes; and complete identity authentication with the second device by using the pre-shared key; and the second device is configured to:

obtain, from the key generation center, a second master public key and a second private key that is corresponding to the second identity, wherein the second identity is the identity of the second device;

send a Transport Layer Security TLS server hello (ServerHello) message, wherein the ServerHello message carries a cipher suite of the selected PSK mode;

obtain the first identity from a Transport Layer Security TLS client key exchange (ClientKeyExchange) message, wherein the first identity is the identity of the first device;

generate the pre-shared key of the selected PSK mode by using the first identity, the second private key, and the second master public key; and complete identity authentication with the first device by using the pre-shared key.

* * * * *